Patented Sept. 23, 1952

2,611,789

UNITED STATES PATENT OFFICE 2,611,789

PRODUCTION OF ALPHA OLEFINS

George M. Good, Albany, and Bernard S. Greensfelder, Oakland, Calif., assignors to Shell Development Company, San Francisco, Calif., a corporation of Delaware No Drawing. Application October 17, 1949, Serial No. 121,908

4 Claims. (Cl. 260—683)

This invention relates to the production of alpha olefins, i. e. olefins having a terminal double bond, by the catalytic cracking of hydrocarbons with a special catalyst under special conditions.

The object of the invention is to provide a means for the catalytic cracking of certain hydrocarbons to produce a product containing a high concentration of primary (alpha) olefins, which product may be used in subsequent synthesis of derivatives of alpha olefins, or from which substantially pure alpha olefins may be separated in large quantities for such synthesis.

Alpha olefins, and especially those having from 6 to about 18 carbon atoms, are particularly suitable starting materials for the synthesis of a variety of important chemicals and are in demand. These olefins are, however, usually found in catalytically cracked gasoline and other petroleum products only in relatively minor concentrations in association with larger amounts of secondary olefins, tertiary olefins, saturates, and aromatic hydrocarbons, and the separation of alpha olefins in suitable concentrations from such mixtures is usually far too costly and complicated to be practicable. Thermal methods for the production of fractions rich in alpha olefins from special, costly feed stocks are known and are used, but in these processes the production of the desired alpha olefins is accompanied by the formation of large amounts of by-products, chiefly gas which is suitable only as fuel gas. The alpha olefins produced by these methods are therefore costly.

By the process of this invention, such alpha olefins are produced by a catalytic method at a much faster rate and with considerably less formation of low-valued gas. Some by-products are also formed in the process of the present invention, but these by-products consist largely of paraffin hydrocarbons which have considerable value and may be easily separated.

In the catalytic cracking of hydrocarbons as carried out at present, the material to be cracked is contacted with one of the few practical cracking catalysts under suitable conditions. The product consists of a mixture of hydrocarbon types in which alpha olefins are present only in very small concentrations and from which the isolation of a fraction consisting predominantly of alpha olefins would be highly infeasible. It is generally recognized that the superiority of catalytic cracking over the older thermal cracking methods lies in the fact that the gasolines produced in catalytic cracking operations are rich in aromatic hydrocarbons, secondary olefins and tertiary olefins, which materials lend better antiknock properties to the gasolines.

There are literally thousands of materials and combinations of materials which are known to possess a certain ability to catalyze the cracking of hydrocarbons. However, there are only a very few of these known materials which are sufficiently active to warrant consideration for practical application. The best of the known catalysts for conventional catalytic cracking are certain specific activated clays, specially prepared synthetic composites of silica and alumina, and specially prepared composites of silica and magnesia. Among the materials known to possess a certain ability to catalyze the cracking of hydrocarbons is activated carbon. Although this material has been often suggested as a cracking catalyst, it is well known that it is quite inferior in respect of gasoline quality as produced therewith to the mentioned cracking catalysts used in industry and, as far as we are aware, it has never been used commercially.

In studying the reasons for this noted inferiority of activated carbon, we found that activated carbon is unique, compared to the other various cracking catalysts, in that with it the catalytic cracking takes place through an entirely different reaction mechanism. Further study of this behavior revealed that by suitably choosing the feed stock and the reaction conditions, it is possible to produce large, hitherto unexpected yields of alpha olefins.

In order to obtain a product of catalytic cracking containing a suitably high concentration of alpha olefins, it is necessary to employ an activated carbon catalyst. It is recognized that products containing of the order of 50% olefins have been obtained by low temperature, low space velocity cracking with a special calcium silicate catalyst-magnesium silicate compound; the olefins produced in this manner are however largely beta olefins. (See U. S. 2,441,962.) As will be seen, activated carbon under suitable conditions is unique in affording high concentrations of alpha olefins with only relatively minor amounts of secondary olefins.

It is not only necessary in the process of the present invention to use an activated carbon catalyst, but it is also necessary that the activated carbon be substantially devoid of so-called catalytic promoters, i. e., materials which improve the activity of the catalyst for specific reactions such as double bond isomerization or aromatization. Thus, impregnation of the activated carbon with small amounts of such materials as $BeO$, $Al_2O_3$, $Cr_2O_3$ and $B_2O_3$ was found to be damaging to the selective cracking activity of the catalyst. In fact, even the small amount of ash constituents usually present in activated carbon has a slight detrimental effect and, as will be shown, it is desirable, though not essential in all cases, to first treat the activated carbon to reduce the ash content, i. e. de-ash it. This may be effected by treating the activated carbon with any acid capable of dissolving out mineral constituents. Examples of such acids are, for example, hydrochloric acid, sulfuric acid, phosphoric acid, dilute nitric acid, hydrofluoric acid and acetic acid. It is desirable to wash the activated carbon after the acid treatment in order to remove adsorbed acid. Although not essential, this washing is desirable, even when a volatile acid such as hydrochloric acid or acetic acid is used, since it avoids corrosion which is not only damaging to the equipment but also causes contamination of the catalyst with the corrosion products.

Small amounts of alkali metal oxides or carbonates when applied to the activated carbon decrease the cracking activity somewhat, but, on the other hand, tend to increase the selectivity of the catalyst for the desired reaction. Small amounts of alkali metal carbonates or oxides, e. g. 0.1–5%, may therefore be advantageously applied to the activated carbon, e. g. by impregnation, in such cases where especially high concentrations of alpha olefins are desired at the expense of their somewhat decreased net production. The function of the alkali metal carbonate or oxide is apparently to neutralize some few centers in the surface of the activated carbon which may otherwise tend to catalyze the cracking through the here undesired mechanism of conventional catalytic cracking. All of the alkali metals are suitable, but we prefer potassium to the other alkali metals. It is also possible to add traces of alkaline nitrogen compounds such, for example, as quinoline and its analogs to the feed stock. These compounds also have been found to poison the catalysts used in conventional catalytic cracking. In other words, it is often advantageous in the present method to employ an activated carbon which has been slightly alkalized by a small amount of an alkaline material which is readily embodied in the activated carbon and remains so embodied under the cracking conditions.

The term "activated carbon" is sometimes loosely used to refer to all forms of carbon and carbon-like substances which are more or less porous, including such materials as petroleum coke, coal coke, charred lignite, bone char, etc. While we refer to "activated carbon," we do not use the term in this loose manner; on the contrary, the term is used to designate that form of carbon or charcoal which is sufficiently microporous and possesses an extent of inner surface sufficient to exhibit marked adsorptive properties. Thus, Mantell states, referring to gas adsorbents, "The World War I brought into existence, as an article of commerce, a new product known as 'activated' carbon. It originated as a means of defense against toxic gases in warfare. It rapidly found industrial applications, the extent and novelty of which are not generally appreciated." "Industrial Carbon," D. van Nostrand Company Inc. 1946; chapter X, "Gas Adsorbents." Activated carbon, as more properly considered, is a particular form of carbon having a very large inner surface of a particular type. Thus, as pointed out by Mantell (loc. cit.), "It has been suggested many times that the best adsorbers are charcoals with very many pores of very small diameter, because they will then present the largest surface for condensation. There are, however, other factors besides the extent of surface. One of the most important of these is the arrangement of the surfaces." In the true activated carbon the carbon particles are extremely fine and have a crystallographic structure related to that of graphite with the carbon atoms arranged in closely packed parallel layers, with atoms of the individual layers disposed at the corners of hexagons. In graphite, the atoms of each layer have a fixed positional relationship to the carbon atoms of the adjacent layers, whereas in the activated carbon this positional relationship of the carbon atoms in the different parallel layers is lacking. The structure is therefore "turbostratic." [See J. Appl. Phy. 13, 6, 364–371 (1942).] The individual primary carbon particles are relatively flat, or plate-like; their size (length or breadth and thickness) may be measured by electron or X-ray diffraction methods. Such measurements have indicated the particles to be in the order of 20 to 60 A. in length or breadth and approximately half as thick. The adsorption isotherms are of the Langmuir type. When the specific surfaces are calculated from the adsorption isotherms by the Brunauer-Emmett-Teller method, surfaces of the order of 1000 square meters per gram are usually obtained, although true activated carbon with surfaces as low as 400 square meters per gram are possible. The pores are relatively uniform in size and are usually of the order of 20 A. diameter.

Activated carbon, as above defined, is a known commercial material produced by known methods from a variety of carbonaceous materials; it is to be pointed out, however, that while almost all carbonaceous materials may be brought to a porous state by a suitable carbonization treatment, only certain selected materials may be converted into a suitable activated carbon. Thus, such materials as bone char, drop black, lamp black, carbon black, coke, petroleum coke, graphite, lignite and coal are not suitable. The best activated carbons are made from certain vegetable matters such as coconut shells, fruit pits, cohune nut shells, babassu nut shells, logwood, ebony and vegetable ivory.

As will be pointed out, when cracking to produce alpha olefins according to this invention, temperatures are applied which, at sufficient residence time of the oil in the heated zone and in the absence of the catalyst, would lead to thermal cracking. In order to maintain this thermal cracking at a negligible minimum, it is essential to use a highly active carbon of the type described. Other more or less porous carbons such as the usual decolorizing carbons used in sugar refining, oil refining and related processes are incapable of catalyzing the reaction at a sufficient rate to permit the use of the low residence times required to diminish thermal cracking adequately. Also, at the higher residence times required to obtain a sufficient conversion with the less active decolorizing carbons, undesirable amounts of aromatic hydrocarbons are formed. Aside from such decolorizing carbons, such materials as carbonized silica-alumina cracking catalyst, activated petroleum cokes and pelleted carbon were also found to be entirely unsuited.

A suitable activated carbon catalyst is not only necessary in the process of the invention, but it is also necessary to properly choose the material to be cracked. The process of the invention is preferably applied to cracking feed stocks which contain a major percentage of paraffin hydrocarbons. Naphthenic hydrocarbons and aromatic hydrocarbons are detrimental and are to be excluded as far as possible. Thus, we prefer to employ a feed stock consisting of at least 90% paraffin hydrocarbons. The paraffinicity of a hydrocarbon mixture can be expressed in terms of its characterization factor K, which is defined as the ratio of the cube root of the average boiling point in degrees Rankine to the specific gravity at 60° F. Through the use of known correlations the average boiling point for heavy materials may be calculated from the viscosity. The values of K range up to about 12.8, pure paraffinic stocks being between 12.5 and 12.8. [See Science of Petroleum, Oxford University Press 1938, vol. II, pp. 1378–1380 and Ind. Eng. Chem. 27, 1460 (1935).] We prefer to employ stocks having a characterization factor of at least 12.35. While we may crack paraffin hydrocarbons as low as hexane, we prefer to crack those having at last 10 carbon atoms. Thus, paraffinic stocks boiling above gasoline (205° C.) may be advantageously used. If the fraction normally contains appreciable concentrations of aromatic hydrocarbons or naphthenic hydrocarbons, these are preferably first removed by any of the known methods. Even better yields of alpha olefins may be obtained from such high molecular weight paraffinic materials as waxy distillates, microcrystalline wax, and even hard paraffin wax having at least 20 carbon atoms.

Although it is possible to crack various hydrocarbon materials catalytically by the conventional methods at temperatures above 550° C., such temperatures are rarely used in commercial practice. The reason for this is that at temperatures above about 550° C. there is a great tendency for the feed material to crack thermally, and when catalytically cracking a feed stock it is generally desired to avoid thermal cracking as much as possible. A particular characteristic of thermal cracking is the production of large volumes of methane, ethylene and ethane with much smaller volumes of $C_3$–$C_4$ hydrocarbons. When oils are catalytically cracked at temperatures of 550° C. or below, the lighter hydrocarbon products are predominantly propane, propylene, butane and butylene. The different character of the light products reflects the difference in the reaction mechanisms of thermal and conventional catalytic cracking. Activated carbon likewise catalyzes the cracking of higher paraffins at lower temperatures of the order of 300° C. to 450° C., but at such temperatures the product contains only minor amounts of olefins. [See Herbst, Z. Ang. Chem. 39, 194–6 (1926).] In the process of the present invention, however, where the specified activated carbon catalyst is employed to catalytically crack the described paraffinic feed stocks to produce alpha olefins, it is essential to operate the process at higher temperatures. Thus, the process should be carried out at a temperature of at least 540° C. and preferably at a temperature between about 550° C. and 640° C. It will be apparent that at these temperatures a large amount of thermal cracking of paraffinic stocks would be expected, provided that adequate residence time is employed. Also, it is well known that carbon catalyzes cyclization to aromatic hydrocarbons at these temperatures. Thus, when normal octane is contacted with activated carbon at a low space velocity (high residence time) and at a temperature above 500° C. the product contains more aromatics than olefins. [See Moldavskii et al., J. Gen. Chem. (U. S. S. R.) 7, 1840–47 (1937).] However, in the process of this invention these undesired thermal and catalytic reactions are avoided by the application of very high space velocities (low residence times) and a product consisting largely of the desired alpha olefin with very little, if any, aromatics is produced. Thus, whereas catalytic cracking is normally operated at a liquid hourly space velocity between about 0.5 and 1.5, the liquid hourly space velocity in the process of the present invention is at least 5 and may be as high as 200. If lower space velocities are used, a product containing undesirable amounts of aromatics is obtained. The liquid hourly space velocity is defined as the volumes of feed stock to be cracked, measured as a liquid, passed in contact with the volume of the catalyst in one hour. The effects of the temperature and the liquid hourly space velocity are illustrated in the examples. At the required space velocities the conversion of the feed stock to products of lower molecular weight is at least 20% and may be above 90%. The liquid cracked products consists essentially of alpha olefins and paraffins. Due to the low concentrations of beta olefins and aromatics, the alpha olefins may be easily separated in a substantially pure state.

The process, when carried out as described, is unique in that the catalytic cracking may be carried out for a considerable period of time before the catalyst becomes contaminated with carbonaceous deposits. Thus, whereas the catalysts now in commercial use for catalytic cracking convert approximately 1 to 10% of the feed to carbonaceous deposits and, therefore, require continuous or frequent periodic regeneration, only a trace (in the order of 0.2%–0.5%) of the feed is converted to carbonaceous deposits in the present process and the process may be carried out for several hours to several days before regeneration becomes necessary. When regeneration finally becomes necessary or is considered desirable, the catalyst may be returned to its initial efficiency by treating it with steam at a temperature between about 650° C. and 750° C. Attempts to regenerate the spent catalyst by burning with oxygen-containing gases, as done in the conventional catalytic cracking process, failed to restore the activity of the catalyst and also resulted in destroying a part of the catalyst.

The catalytic cracking according to the present process may be carried out at any pressure from subatmospheric pressure up to several atmospheres. However, operation at substantially atmospheric pressure or at subatmospheric partial pressure of the hydrocarbon feed stock is preferred. The subatmospheric partial pressure may be obtained advantageously by the use of a suitable diluent material which lowers the partial pressure of oil in the cracking zone. It is found that the selectivity of the catalyst for the production of olefins may be improved at the expense of only a small decrease in the conversion by the use of a diluent material. Any inert gas may be employed as a diluent to afford the reduced pressure, although steam is preferred, as illustrated in the examples.

The contacting of the paraffin feed with the specified activated carbon under the described conditions may be carried out in any of the conventional manners. One suitable method is to place the catalyst as a bed of granules in a reaction vessel which is provided with a means for maintaining the desired temperature and to pass the vaporized feed and diluent through the catalyst bed at the required rate. The activated carbon may be in the form of pieces ranging from about 40 microns in diameter up to as large as desired. The finer material (usually cheaper) may be used in a fluidized bed or it may be formed by pelleting into larger pieces of suitable size for fixed bed operation.

Example I

A feed stock consisting of normal paraffins ranging from about $C_{20}$ to about $C_{30}$ (molecular weight about 368) was catalytically cracked under the following conditions:

| | |
|---|---|
| Temperature | 550° C. |
| Pressure | Atmospheric |
| Liquid hourly space velocity | 32 |

The catalyst used was a commercial adsorptive activated carbon. This carbon had the following properties:

| | |
|---|---|
| Form | 4–14 mesh granules |
| Density in bulk | 0.50 |
| Adsorption isotherm | Langmuir type |
| Surface area | about 1500 m.²/g. |
| Ash content | 2.1% |
| Average pore size | 20 A. |
| Structure by electron diffraction | Turbostratic |
| Size of ultimate C particles | 24 A. length, 8 A. thickness |

Under these conditions 43.3% of the feed was cracked to products boiling below 289° C. Only about 0.4% of the change was converted to coke and only about 5.4% was converted to propane and lighter gases. Thus, the ratio of liquid products to gas was about 7. The olefin contents of various fractions of the product were as shown in the following table:

| Product Fraction, °C | Olefin, Percent by Weight |
|---|---|
| 42–74 | 62 |
| 74–99 | 63 |
| 99–125 | 56 |
| 125–152 | 54 |
| 152–174 | 54 |
| 174–196 | 54 |
| 196–217 | 51 |
| 217–238 | 50 |
| 238–255 | 51 |
| 255–273 | 47 |

The olefins were largely alpha olefins as shown by the following olefin analyses of representative fractions:

| Product Fraction, °C | Composition of Olefins, Percent by Weight | | |
|---|---|---|---|
| | Alpha | Secondary | Tertiary |
| 42–74 | 87 | 13 | 0 |
| 196–217 | 76 | 24 | 0 |

The formation of aromatics under these conditions was small, as shown by the following weight percentages of the 74–152° C. fraction of the product:

| | |
|---|---|
| Benzene | 0.2 |
| Toluene | 1.6 |
| Ethylbenzene | 1.8 |
| Xylenes | 3.0 |

Example II

The above described feed stock was catalytically cracked with the same catalyst under the same conditions except that the partial pressure of the oil feed stock was reduced to about 110 mm. Hg by the application of 6 moles of steam per mole of hydrocarbon feed. This resulted in decreasing the conversion to about 33%. On the other hand, the olefin content of the product was increased about 5%, and the formation of carbonaceous deposits was approximately halved.

Example III

After the ash content of the above carbon catalyst was reduced from 2.1% to about 0.27% by treatment with hydrochloric acid, comparable runs on the catalytic cracking of cetane showed an increase in the conversion from 67.9% to 70.3% with no significant change in the product distribution.

Example IV

A straight run California naphtha boiling between 143° C. and 204° C. and containing about 16% by weight of aromatics was catalytically cracked over activated carbon at a temperature of 500° C. and at a liquid hourly space velocity of 1. In this case the liquid product contained 45% aromatics and 16% total olefins. This example illustrates the totally different results obtained when treating a more conventional type feed under the more conventional lower space velocity and temperature conditions.

Example V

A batch of an activated carbon catalyst was used until it was heavily contaminated with carbonaceous deposits. The activity of the contaminated catalyst was only 6% of that of the fresh catalyst.

The contaminated catalyst was regenerated by steaming at 680° C.–700° C. until an amount of carbon was removed which corresponded to the amount of contaminants present. The regenerated catalyst was found to have the same properties as the fresh catalyst and to be somewhat more active.

When the catalyst was regenerated at higher temperatures in the range of 780° C.–860° C., it was found that the bulk density of the catalyst increased and the full activity was not restored. Regeneration of the catalyst at temperatures approximately between 650° C. and 750° C. is recommended. As stated above, attempts to regenerate the catalyst with nitrogen-air mixtures failed; it appears that in this case both the catalytic carbon and the inactive deposits are burned indiscriminately.

Example VI

The importance of the temperature and space velocity in producing alpha olefins is illustrated in the following:

When cracking cetane at 500° C. and a space velocity of 1.5, the product consists predominantly of paraffins and aromatics with only minor amounts of olefins, as can be seen from the following analyses by weight percentage of representative fractions of the product:

| | Product Fraction, °C. | | | |
|---|---|---|---|---|
| | 42–99 | 99–125 | 125–152 | 152–174 |
| Aromatics | 5.6 | 18.8 | 30.5 | 28.7 |
| Saturates | 77.3 | 66.5 | 58.8 | 60.0 |
| Olefins (total) | 17.1 | 14.7 | 10.7 | 11.3 |

When the operation is carried out at 550° C. at a space velocity of 10 the olefin content is at least doubled, and, equally important, the ratio of alpha olefins to secondary olefins increases. Typical weight percentage olefin analyses are as follows:

| Product Fraction, °C. | Olefins | |
|---|---|---|
| | Total, percent | Alpha/Secondary Ratio |
| 42-74 | 43.8 | 2.1 |
| 125-152 | 34.4 | 1.0 |
| 196-217 | 30.6 | 0.9 |

When the operation is carried out at 640° C. and a liquid hourly space velocity of 102, the olefin content reaches a high level; equally important, the ratio of alpha olefins to secondary olefins also becomes much higher, as seen from the following weight percentage analyses:

| Product Fraction, °C. | Olefins | |
|---|---|---|
| | Total, percent | Alpha/Secondary Ratio |
| 42-74 | 85 | 6.1 |
| 74-125 | 83 | 4.2 |
| 125-152 | 78 | 3.3 |
| 152-174 | 76 | 3.2 |
| 196-217 | 72 | 2.3 |

While 550° C. is about the minimum applicable temperature in the cracking of cetane, somewhat lower temperatures may be applied when cracking much heavier stocks, such as waxes. We prefer to operate, however, at temperatures of at least 550° C.

It will be seen from the above that the present process affords a method for the production of alpha olefins in sufficiently high concentrations to make their separation practicable. This desired result is obtained firstly by using a particular catalyst which operates through a different reaction mechanism than the usual cracking catalysts; secondly, by employing a feed stock which is very highly paraffinic and preferably also of high molecular weight; thirdly, by employing very high space rates to minimize the undesired more general reaction of thermal cracking and the catalytic reaction of cyclization to aromatics and self-hydrogenation of olefins to paraffins; fourthly, by employing temperatures sufficiently high to allow the desired space rate to be employed while at the same time obtaining a reasonable conversion; and fifthly, by employing a special type of carbon which is sufficiently active and selective to allow the desired space rate to be applied and to cause the desired reactions to take place at a rate much above the thermal cracking rate of the feed stock at the temperatures employed.

The invention claimed is:

1. A process for the production of alpha olefins which comprises catalytically cracking a feed stock consisting largely of paraffins having at least 6 carbon atoms and having a characterization factor of at least 12.35, at a temperature of at least 540° C. but not substantially in excess of 700° C. and at a liquid hourly space velocity of at least 5 affording a substantial conversion of the stock, the catalyst being activated carbon of turbostratic structure, thereby to produce a product consisting predominantly of alpha olefins and paraffins.

2. A process for the production of alpha olefins which comprises catalytically cracking a feed stock consisting largely of paraffins having at least 6 carbon atoms and having a characterization factor of at least 12.35, at a temperature of at least 540° C. but not substantially in excess of 700° C. and at a liquid hourly space velocity of at least 5 affording a substantial conversion, the catalyst being a de-ashed activated carbon of turbostratic structure, thereby to produce a product consisting predominantly of alpha olefins and paraffins.

3. A process for the production of alpha olefins which comprises catalytically cracking a feed stock consisting largely of paraffins having at least 6 carbon atoms and having a characterization factor of at least 12.35, at a temperature of at least 540° C. but not substantially in excess of 700° C. and at a liquid hourly space velocity of at least 5 affording a substantial conversion, the catalyst being an alkali impregnated activated carbon of turbostratic structure, thereby to produce a product consisting predominantly of alpha olefins and paraffins.

4. A process for the production of alpha olefins which comprises catalytically cracking a feed stock consisting largely of paraffins having at least 6 carbon atoms and having a characterization factor of at least 12.35, at a temperature of at least 540° C. but not substantially in excess of 700° C. and at a liquid hourly space velocity of at least 5 affording a substantial conversion of the stock, and at a subatmospheric partial pressure of oil, the catalyst being activated carbon of turbostratic structure, thereby to produce a product consisting predominantly of alpha olefins and paraffins.

GEORGE M. GOOD.
BERNARD S. GREENSFELDER.

REFERENCES CITED

The following references are of record in the file of this patent:

UNITED STATES PATENTS

| Number | Name | Date |
|---|---|---|
| 1,895,063 | Zurcher | Jan. 24, 1933 |
| 2,097,989 | Schick et al. | Nov. 2, 1937 |
| 2,172,228 | Van Peski | Sept. 5, 1939 |
| 2,428,715 | Marisic | Oct. 7, 1947 |

FOREIGN PATENTS

| Number | Country | Date |
|---|---|---|
| 35,617 | France | Mar. 26, 1930 |
| | (Addition to No. 635,889) | |
| 416,976 | Great Britain | Sept. 19, 1934 |